June 4, 1935.  L. D. MYERS  2,003,513

ANIMAL TRAP

Filed Nov. 2, 1932

INVENTOR
LLOYD D. MYERS
BY Reif & Braddock
ATTORNEYS

Patented June 4, 1935

2,003,513

UNITED STATES PATENT OFFICE 2,003,513

ANIMAL TRAP

Lloyd D. Myers, Minneapolis, Minn.

Application November 2, 1932, Serial No. 640,739

9 Claims. (Cl. 43—98)

This invention relates to a trap, and particularly to an animal trap. While the trap may have various applications and be constructed and arranged for trapping various animals, it particularly is designed for trapping smaller animals, such as mice.

With many mouse traps as now constructed, the animal is trapped and confined in an enclosure while alive. It is a disagreeable task to many people for various reasons, to kill the trapped mice or rats. This is often an inconvenient task.

It is an object of this invention, therefore, to provide a trap in which the animal will be killed shortly after entering the trap, and the animal can then be easily discharged from the trap without inconvenience.

It is a further object of the invention to provide a trap comprising a casing having a chamber therein and an opening for entrance into said chamber, said trap having at its bottom a member forming an electrode of an electric circuit, together with a wall adjacent said member forming another electrode, whereby the mouse or animal entering said opening will engage said electrodes, complete said circuit, and be electrocuted.

These and other objects and advantages of the invention will be fully set forth in the following description made in connection with the accompanying drawing, in which like reference characters refer to similar parts throughout the several views, and in which:—

Figure 1:
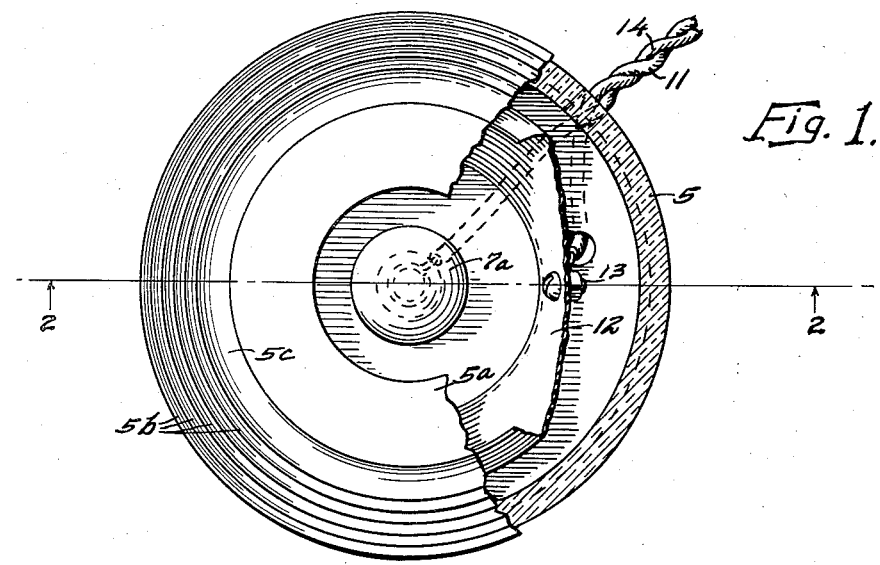
Fig. 1 is a top plan view of the trap, certain portions being broken away and others shown in horizontal section.
Figure 2:
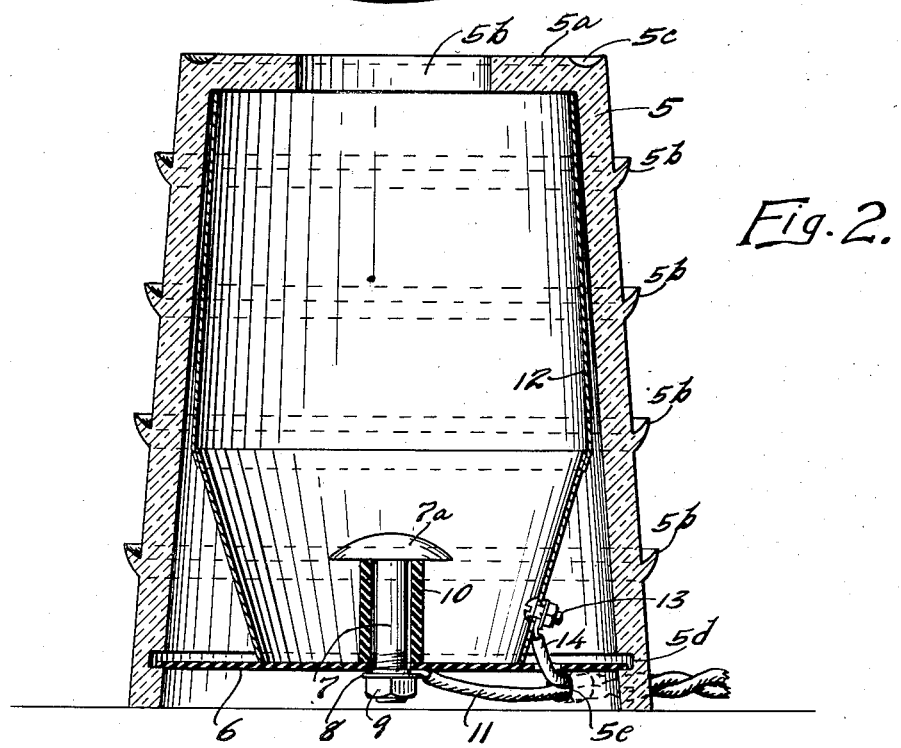
Fig. 2 is a vertical section through the trap taken substantially on line 2—2 of Fig. 1 as indicated by the arrows.

Referring to the drawing, a trap is shown comprising a casing 5. While this casing might be variously made, in the embodiment of the invention illustrated it is shown as of general cylindrical form tapering slightly from its bottom toward its top and having a top portion 5a through which extends an opening 5f. While opening 5f may be variously located, in the embodiment of the invention illustrated it is shown as disposed substantially centrally of top 5a. The casing 5 may be made of various materials, but preferably is made of a material which is a non-conductor of electricity, such as glass, porcelain, etc. Casing 5 is shown as having projecting from its exterior wall a plurality of outwardly and upwardly projecting ribs 5b tapering to a comparatively thin edge at their outer portions. The ribs 5b are spaced at substantially equal distances along the side of casing 5 and a groove 5c extends about the top surface of the top 5a adjacent its edge, said groove forming a rather sharp edge about the top 5a. The ribs 5b enable an animal such as a mouse to readily climb up the side of the casing 5 to the top thereof. Casing 5 has a chamber therein and a bottom 6 is provided for said chamber. Said chamber has a substantially vertical and unobstructed inner side wall. While member 6 might be made of various materials and supported in various ways, it is preferably made of insulating material such as fibre and is shown as having its edge received in an annular groove 5d extending about the inner wall of casing 5. The disk or plate 6 thus rests upon the bottom of the groove 5d. A member 7 is provided, formed of a material which is a conductor of electricity, such as metal, and said member has a top 7a shown as of circular outline and having a convex top surface. Member 7a has its vertical shank portion threaded at its lower end and extending through plate 6 and provided with a washer 8 and nut 9. A sleeve 10 of insulating material surrounds the vertically extending or shank portion of member 7 resting on plate 6 at its lower end and is engaged by the under side of the head 7a at its upper end. This sleeve 10 is thus held clamped between the head 7a and disk 6 when nut 9 is tightened. A conductor 11 is connected at one end to the member 7, being clamped in position by the washer 8 and nut 9. Conductor 11 is shown as an ordinary insulated cord and the same extends from member 7 beneath the plate 6 through an opening 5e formed in the lower portion of the casing 5. Another member 12 is provided, of annular plate-like form, the same extending from the top inner wall of casing 5 downwardly substantially parallel to the inner wall of said casing to a point some distance above member 7 and then slopes inwardly to the plate 6 on which it is supported. Member 12 is made of material forming a conductor of electricity such as metal and the same has secured therein adjacent its bottom, a binding post 13, to which is secured another conductor 14 which extends through an opening in plate 6 and also extends outwardly through the opening 5e in casing 5. The conductors 11 and 14 form part of an ordinary electrical cord which will have a plug connected to their ends so as to be inserted in an electric socket from which current will be supplied.

In operation, the trap will be disposed in a place frequented by the animals to be trapped, such as mice, and the conductors 11 and 14 will, as stated, be connected to a source of electricity. Some suitable bait, such as small pieces of cheese or meal will be placed on the bottom member 6 about the member 10. A mouse will be attracted by the bait, will climb to the top of casing 5 and enter the chamber in said casing through the opening 5f. The mouse can very readily climb up the side of casing 5 by engaging the ribs 5b with its claws. It will, of course, be seen that members 7 and 12 are separated by insulating material until they are bridged by the body of the animal. The mouse must jump or drop toward the bottom 6. In doing this it will contact the top of member 7 and will also engage the member 12. As described, member 7 will form one electrode of an electric circuit, while member 12 will form the opposite electrode. The body of the animal touching these members will therefore complete an electric circuit and will be electrocuted. After being thus killed, the animal's body will become limp and it will drop below the top portion 7a of the member 7 so as to no longer engage this electrode. The body will then lie limp on the bottom plate 6. There will thus be no burning of the animal due to the electric current. Ordinarily the voltage will be so adjusted that any such burning will be avoided. When it is desired to remove the animal, the trap will be picked up and inverted and the dead animal will drop out through the opening 5f into a suitable receptacle.

From the above description it is seen that applicant has provided a simple and efficient trap, and one which can be made at quite a small expense. The trap can be disposed in any desired location about the modern house and only needs to have the electrical cord or extension to be connected in an electric socket. The trap is quite sanitary and can be readily cleaned by washing, if desired. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. An animal trap having in combination, a casing adapted to rest upon a supporting surface and having a chamber therein having a bottom, the same having an opening adjacent its upper end and having substantially vertical walls whereby an animal entering said opening will jump or drop to said bottom, a member upstanding from said bottom forming one electrode of an electric circuit, a second annular member surrounding said member adjacent the wall of said chamber and sloping toward said member to be adjacent the same, said latter member forming the opposite electrode of said circuit, whereby an animal entering said opening and dropping or jumping to said bottom will engage said electrodes, complete the circuit and be electrocuted.

2. An animal trap having in combination, a casing adapted to rest upon a supporting surface and formed of electrical non-conducting material having a chamber therein, a bottom of non-conducting material for said chamber supported in said casing, a member upstanding from said bottom forming one electrode of an electric circuit, a second member of electrical conducting material sloping downwardly toward the same and forming the opposite electrode of said circuit, said casing having an opening in its top affording entrance to said chamber whereby an animal entering said opening and approaching said bottom will engage both of said members, complete an electric circuit and be electrocuted, said first mentioned member having the portion thereof adjacent said bottom insulated and having its exposed portion some distance above said bottom, whereby an animal after being electrocuted may drop below said exposed portion and break said circuit.

3. An animal trap having in combination, a casing having approximately vertical walls and having a chamber therein with approximately vertical and substantially unobstructed walls, said casing having ledges on its exterior enabling an animal such as a mouse to climb up the side of said casing, said casing having a substantially horizontal top with an opening therein, a bottom in said casing some distance from said top, a member upstanding from the bottom of said casing forming one electrode of an electric circuit, a member in said casing extending about the same closely adjacent the wall thereof and sloping toward said first mentioned member adjacent its bottom and forming an opposite electrode of said circuit whereby an animal entering through said opening will engage both of said members, complete said circuit and be electrocuted.

4. An animal trap having in combination, a casing having a chamber therein with substantially unobstructed walls inclining upwardly and inwardly, and having an opening in its upper portion, a bottom disposed below said opening on which bait may be placed, a member upstanding from said bottom forming one electrode of an electric circuit, a second member extending about said chamber and disposed adjacent said first mentioned member adjacent said bottom and forming an opposite electrode of said circuit whereby a mouse entering said opening and jumping or dropping to said bottom will engage both of said members, complete said circuit, and be electrocuted.

5. An animal trap having in combination, a substantially closed casing having a bottom and side walls, said casing having a chamber therein with a substantially unobstructed side wall and an opening adjacent its top for the entry of an animal, said bottom being of insulating material and spaced from the top of said chamber so that an animal cannot reach to said bottom from the top of said casing, a member extending upwardly from said bottom forming an electrode and a member spaced from said member and adjacent said side walls forming the other electrode of an electric circuit whereby an animal entering said opening will engage said electrodes and be electrocuted, said first mentioned member having an electrode-forming top portion and a cover of insulating material surrounding said member between said top portion and said bottom.

6. An animal trap having in combination, a substantially closed casing adapted to rest on a supporting surface and having a chamber therein, said chamber having a bottom and an unobstructed substantially vertical inner wall, a member supported on said bottom forming an electrode, an annular member spaced from said member forming another electrode, said casing having an opening at its upper portion spaced at considerable distance from said bottom for the entry of an animal into said chamber whereby an animal entering said opening and jumping or dropping to said bottom will engage said electrodes and be electrocuted.

7. An animal trap having in combination, a casing adapted to rest upon a supporting surface, the same having a chamber therein with a bottom and a substantially vertical inner wall, said casing having a top spaced from said bottom a distance greater than the length of the body of said animal, said top having an opening therethrough for the entry of an animal, a member at the bottom of said casing forming one electrode of an electric circuit, a second member in said casing spaced from said member and forming the opposite electrode for said electric circuit, said members being disposed adjacent each other whereby an animal entering said opening must jump or drop to the bottom of said casing and will engage both of said members, complete said circuit and be electrocuted.

8. An animal trap having in combination, a casing having a chamber therein with an approximately vertical wall, said chamber having a bottom and a top spaced a considerable distance from said bottom, said top having an opening therein for the entry of said animal and also forming a flange extending inwardly from said wall to form a barrier against the exit of said animal, a member at the bottom of said casing forming one electrode of an electric circuit, a second member in said casing adjacent the wall of said chamber and forming the opposite electrode for said electric circuit, said members being disposed adjacent each other, whereby an animal entering said chamber through said opening must jump or drop to said bottom and will engage said electrodes and be electrocuted.

9. An animal trap having in combination, a casing having approximately vertical walls and having a chamber therein with an approximately vertical and substantially unobstructed wall, said casing having ledges on its exterior enabling an animal such as a mouse to climb up the side of said casing, said casing having a top with an opening therethrough affording an entrance to said chamber by said animal, said chamber having a bottom spaced a considerable distance from said top and opening, said distance being greater than the length of the body of said animal, a member upstanding from said bottom and forming one electrode of an electric circuit, a second member in said chamber extending about said first mentioned member adjacent the same and forming the other electrode of said circuit, whereby an animal such as a mouse may climb up said ledges, enter said opening and jump or drop to said bottom, where it will engage said electrodes and be electrocuted.

LLOYD D. MYERS.